United States Patent [19]

O'Connor et al.

[11] Patent Number: 5,521,272
[45] Date of Patent: May 28, 1996

[54] ISOCYANATE-CROSSLINKED COATINGS HAVING REDUCED YELLOWING

[75] Inventors: James M. O'Connor, Branford; Stephen P. Noe, Fairfield; Henry J. Barnowski, Jr., Durham; Ronald T. Wojcik, Cheshire, all of Conn.

[73] Assignee: Olin Corporation, Cheshire, Conn.

[21] Appl. No.: 427,504

[22] Filed: Apr. 24, 1995

Related U.S. Application Data

[62] Division of Ser. No. 116,945, Sep. 3, 1993.

[51] Int. Cl.$^6$ .............................. B05D 7/16; C08G 18/80
[52] U.S. Cl. .......................................... 528/45; 427/388.2
[58] Field of Search ...................... 528/45; 427/385.5, 427/388.2

[56] References Cited

U.S. PATENT DOCUMENTS

| | | | |
|---|---|---|---|
| 4,008,247 | 2/1977 | Tucker | 260/308 B |
| 4,546,046 | 10/1985 | Etzell et al. | 428/460 |
| 4,584,354 | 4/1986 | Hudecek et al. | 525/454 |
| 4,623,731 | 11/1986 | Ivanov et al. | 548/374 |
| 4,976,837 | 12/1990 | Hughes et al. | 204/181.7 |
| 5,216,078 | 6/1993 | Cook et al. | 525/124 |

FOREIGN PATENT DOCUMENTS

| | | |
|---|---|---|
| 159117 | 10/1985 | European Pat. Off. . |
| 2153346 | 8/1985 | United Kingdom . |

OTHER PUBLICATIONS

The Chemistry and Technology of Blocked Isocyanates. Cooray et al, Paint and Resin, Oct. 1988, pp. 18–19.

*Primary Examiner*—Shrive Beck
*Assistant Examiner*—Erma Cameron
*Attorney, Agent, or Firm*—Dale L. Carlson

[57] ABSTRACT

A clear or colorless coating that is free of yellow discoloration, and a method for the production thereof, utilizing a pyrazole compound as a blocking agent for the blocked polyisocyanate employed in the coating composition.

4 Claims, No Drawings

5,521,272

ISOCYANATE-CROSSLINKED COATINGS HAVING REDUCED YELLOWING

This application is a division of application Ser. No. 08/116,945, filed Sep. 3, 1993.

FIELD OF THE INVENTION

This invention relates generally to clear or colorless coatings made using blocked polyisocyanates and, more specifically, to clear coatings that are free of yellow discoloration.

BACKGROUND OF THE INVENTION

Frequently used commercial methods for producing clearcoats for automotive and other coatings applications involve application of a clearcoat composition over a high-solids basecoat. Clearcoat compositions can be characterized as being of the one-component type or the two-component type. In the two-component or "two-pack" system, the polymer and the cross-linking agent are combined Just prior to coating. However, this two-component process generally requires mixing of the components in the right proportion immediately prior to coating, and is expensive to operate and difficult to control. In contrast, the one-component or "one-pack" systems offer significant advantages in manufacturability because the cross-linkable clearcoat coating composition can be coated as one formulation. However, when highly reactive crosslinking agents such as polyisocyanates are used, the cross-linking agent in one-component systems must be blocked in order to prevent premature cross-linking of the clearcoat composition. The blocking group can then be unblocked under specified conditions, such as an elevated temperature, to allow the materials to crosslink so the coating can be cured.

Up until recently, an elevated temperature of 160° C. or more was required to cause unblocking of the polyisocyanate in order to enable the desired clear-coat to form during the coating operation. Recently, there has been a trend in the industry to discover blocking agents that unblock at lower temperatures, thereby affording an energy savings during production of the desired coating, regardless of whether a clear-coat or a pigmented paint is desired. Illustrative examples of blocking agents that provide unblocking at lower temperatures are the pyrazole-containing compounds as disclosed in U.S. Pat. No. 4,976,837 for use in pigmented paint compositions.

Clearcoats that have been cross-linked with blocked isocyanate cross-linking agents also exhibit good hardness, and they are also resistant to environmental etch, i.e., etch appearing as milky or cloudy marks on clearcoat finishes that have been exposed to the elements. Unfortunately, however, these clearcoats suffer from severe yellowing during heat curing. Moreover, unlike coatings derived from unblocked aromatic polyisocyanates, coatings derived from blocked isocyanates tend to exhibit significant yellowing during cure even when an aliphatic polyisocyanate is used.

Heretofore, attempts to reduce the yellow discoloration of clearcoats that have been cross-linked with blocked isocyanates have typically utilized additives to inhibit or otherwise minimize the yellow discoloration problem. By way of illustration, U.S. Pat. No. 5,216,078 discloses the addition of a hydrazide group, either attached to the blocked polyisocyanate itself, or attached to the polyisocyanate-reactive polymer (e.g., polyol) in the formulation, or attached to another compound as a formulation additive. Unfortunately, the introduction of extraneous hydrazide moieties to the clearcoat-forming formulation can adversely affect the formulation and/or processing expense of the resulting clearcoat.

In view of the above, new methodology for providing a one-component polyisocyanate-cross-linked clear coating which avoids discoloration without the use of discoloration-prevention additives would be highly desired by the clear coatings manufacturing community.

SUMMARY OF THE INVENTION

In one aspect, the present invention relates to a method of producing a clear polyurethane coating on a substrate which comprises coating the substrate with a pigment-free coating composition consisting essentially of a polyisocyanate blocked with a pyrazole compound blocking agent and an isocyanate-reactive polymer, said coating composition being free of hydrazide moieties (and preferably free of other yellow discoloration prevention additives).

In another aspect, the present invention relates to a method of using a pyrazole compound blocked isocyanate to provide a clear coating on a substrate which is free of yellow discoloration, said method comprising coating a painted or unpainted substrate (advantageously a metal or plastic substrate) with a pigment-free coating composition consisting essentially of a polyisocyanate blocked with a pyrazole compound blocking agent and an isocyanate-reactive polymer, said coating composition being free of hydrazide moieties (and preferably free of other yellow discoloration prevention additives).

In yet another aspect, the present invention relates to a method of using a pyrazole compound-blocked polyisocyanate in order to provide a clear coating on a substrate which comprises the steps of:

(a) forming a pigment-free coating composition comprising a mixture of said pyrazole compound blocked polyisocyanate and a polymer containing at least one isocyanate-reactive functional group, said coating composition being free of hydrazide compounds, and (b) contacting said pigment-free coating composition with a substrate in order to form a clear coating on said substrate.

In still another aspect, the present invention relates to a coated article comprising a painted or unpainted substrate and a coating on said substrate free of yellow discoloration and formed by:

(a) forming a pigment free coating composition comprising a mixture of said pyrazole compound blocked polyisocyanate and a polymer containing at least one isocyanate-reactive functional group, said coating composition being free of hydrazide compounds, and (b) contacting said pigment-free coating composition with a substrate in order to form a clear coating on said substrate.

These and other aspects of the present invention will become readily apparent upon reading the following detailed description of the invention.

DETAILED DESCRIPTION OF THE INVENTION

It has now been surprisingly found in accordance with the present invention that the yellow discoloration problem associated with clearcoats that have been cross-linked using blocked isocyanates is suitably avoided and/or minimized by using a pyrazole compound as a blocking agent. Without wishing to be bound by any particular theory, it is believed that the clear, colorless property associated with the coatings of the present invention is attributable, at least in part, to a combination of the relatively low unblocking temperature of the pyrazole blocking agent and the color stability of the blocking agent and the after unblocking in the coating formulation.

The composition according to the present invention comprises a polymer having at least one functional group that is reactive with isocyanate. Such polymers include, for example, acrylic polymers, modified acrylic polymers, polyesters, polyepoxides, polycarbonates, polyurethanes, polyamides, polyimides, and polysiloxanes, all of which are well-known in the art. Preferably, the polymer is an acrylic, modified acrylic or polyester. More preferably, the polymer is an acrylic polymer. The above polymers may have any of a number of known functional groups that are reactive with isocyanate. Such groups include, for example, hydroxyl groups, amino groups, and thiol groups.

In one preferred embodiment of the invention, the polymer is an acrylic. Such polymers are well-known in the art, and can be prepared from monomers such as methyl acrylate, acrylic acid, methacrylic acid, methyl methacrylate, butyl methacrylate, cyclohexyl methacrylate, and the like. The functional group that is reactive with isocyanate, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylaminoethylacrylate. Other acrylic monomers having isocyanate reactive functional groups in the ester portion of the monomer are also within the skill of the art.

Modified acrylics can also be used as the polymer (a) according to the invention. Such acrylics are typically polyester-modified acrylics or polyurethane-modified acrylics, as is well-known in the art. An example of one preferred polyester-modified acrylic is an acrylic polymer modified with alpha-caprolactone. Such a polyester modified acrylic is described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having hydroxyl groups, acid groups, or amino groups as isocyanate-reactive groups can also be used as the polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

The composition according to the present invention utilizes a blocked isocyanate as a curing agent for the above-described polymers. Compounds suitable as the isocyanate portion of the blocked isocyanate are well known in the art, and include toluene diisocyanates, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate ("IPDI"), isocyanurates of isophorone diisocyanate ("IPDI trimer"), IPDI biuret, 1,6-hexamethylene diisocyanate ("HDI"), isocyanurates of 1,6 hexamethylene diisocyanate ("HDI trimer"), HDI biuret, 1,4-cyclohexane diisocyanate, p-phenylene diisocyanate, and triphenylmethane 4,4',4"-triisocyanate, tetramethyl xylene diisocyanate, metaxylene diisocyanate, and polyisocyanate oligomers and other adduces. The preferred polyisocyanates are HDI trimer, HDI biuret, IPDI trimer, IPDI biuret, and combinations thereof.

The blocking agents used in the present invention are pyrazoles of the formula:

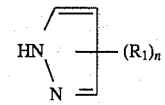

where $R_1$ and n are as defined as follows:
n is is 0, 1, 2 or 3
wherein $R_1$ is, or, where n is more than 1, each $R_1$, which may be the same or different, is a $C_1$–$C_4$ alkyl, $C_1$–$C_4$ alkenyl, phenyl $C_1$–$C_4$ alkyl, phenyl, $NO_2$—, halogen or

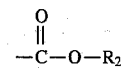

group. Examples of the pyrazoles described include 3,5-dimethylpyrazole, 4-nitro-3,5-dimethylpyrazole, 4-benzyl-3,5-dimethylpyrazole (DMP), methyl 5-methylpyrazole-3-carboxylate, 4-bromo- 3,5-dimethylpyrazole, pyrazole, 3-methyl-5-phenylpyrazole and 3,5-dimethylpyrazole-4-carboxanilide (prepared by condensation of hydrazine acetate with diacetoacetanilide).

The blocked isocyanate is preferably present in the coating composition in an amount of from about 10 weight percent to about 60 weight percent, and more preferably from about 15 weight percent to about 40 weight percent.

A solvent may optionally be utilized in the one-component clearcoat formulation used in the present invention. Although the formulation of the present invention may be utilized, for example, in the form of substantially solid powder, or a dispersion, it is often desirable that the formulation used in the present invention is in a substantially liquid state, which can be accomplished with the use of a solvent. This solvent should act as a solvent with respect to both the hydroxy-functional polymer as well as the blocked isoyanate. Preferably the solvent is present in an amount effective to substantially solubilize both the hydroxy-functional polymer and the blocked isocyanate. In general, the solvent can be any organic solvent and/or water. Preferably, the solvent is a polar solvent, as polar solvents may allow the blocking agent to dissociate (i.e. deblock) at lower temperatures. More preferably, the solvent is a polar aliphatic solvent or polar aromatic solvent. Still more preferably, the solvent is a ketone, ester, acetate, aprotic amide, aprotic sulfoxide, aprotic amine, and water. Examples of useful solvents include methyl ethyl ketone, methyl isobutyl ketone, m-amyl acetate, ethylene glycol butyl ether-acetate, propylene glycol monomethyl ether acetate, xylene, n-methylpyrrolidone, and blends of aromatic hydrocarbons.

The solvent may be present in the coating composition in an amount of from about 0.01 weight percent to about 99 weight percent, preferably from about 10 weight percent to about 60 weight percent, and more preferably from about 30 weight percent to about 50 weight percent.

The catalyst may be present in the coating composition in an amount of from about 0.01 weight percent to about 10 weight percent, preferably from about 0.1 weight percent to about 2 weight percent, and more preferably about 0.5 weight percent. The above-described coating compositions can be coated on the article by any of a number of techniques well-known in the art. These include, for example, spray coating, dip coating, roll coating, curtain coating, and the like. For automotive body panels, spray coating is preferred.

In one preferred embodiment, th clear and/or colorless coating composition according to the invention is used over a pigmented basecoat as part of a composite color-plus-clear coating. Such composite coatings are popular for their depth of color and liquid glossy surface appearance. They have found particularly wide acceptance in the field of automotive coatings.

Pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and avaiable for the crosslinking reaction under the desired curing conditions, generally elevated temperatures. Useful cross-linkable functional groups include hydroxy, epoxy, acid, anhydride, silane, and acetoacetate groups. Preferred crosslinkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional crosslinking agents.

After the article is coated with the above-described layers according to the invention, the coated article is subjected to conditions so as to cure the coating layers. Although various methods of curing may be used, heatcuring is preferred. Generally, heat curing is effected by composing the coated article to elevated temperatures provided primarily by radiative heat sources. Curing temperatures will vary depending on the particular blocking groups used in the cross-linking agents, however they generally range between 120° C. and 175° C., and are preferably between 132° C. and 157° C. The invention is particularly effective at reducing yellowing that takes place when cure temperatures exceed 141° C., and especially when cure temperatures exceed 163° C. The curing time will vary depending on the blocking agents, and physical parameters such as the thickness of the layers, however, typical curing times range from 15 to 60 minutes.

The invention is further described in the following example.

EXAMPLE 1

HEAT AGING AND UV AGING COMPARISON OF CLEAR COATINGS PRODUCED USING A DMP BLOCKING AGENT VERSUS A MEKO BLOCKING AGENT (A) Heat Aging In order to determine the coating color stability associated with the use of a pyrazole blocking agent DMP, as compared with a commercial blocking agent, methylethylketoxine ("MEKO") the following evaluation was made.

Coating formulations were prepared utilizing an acrylic polyol (100 pbw of G-CURE 105P70, a product of Henkel Corporation having a hydroxyl equivalent weight of 516 on a solids basis "acrylic polymer #1" or 100 pbw of "acrylic polymer #2" from Korea Chemical company having a hydroxyl equivalent weight of 467 on a solids basis), a flow aid (0.68 pbw of a 10% solution of FC 430 a product of 3M Company), 4 pbw of a 10% solution dibutyltin dilaurate catalyst, 70 pbw of a solvent blend (a 1:1:1 weight ratio blend of butyl acetate, methyl amyl ketone, and ethoxyethyl propionate) in order to provide a coating formulation spray viscosity of 20 seconds, and HDI trimer or a blend of HDI trimer with IPDI trimer. The trimer was employed in the amounts shown in Table I below. The coating formulations employed a blocked NCO/OH ratio of 1.1/1 for each formulation.

Steel test panels precoated with BONDERITE 1000 and a white acrylic-melamine basecoat were spray coated with each of the eight coating formulations identified in Table I. The coating on each panel was allowed to room temperature dry for 5 to 15 minutes, and then the panels were oven baked at a temperature of 280° F. for 20 minutes. The panels were then "overbaked" at an oven temperature of 305° F. for 30 minutes in order to check for "overbake" yellowing resistance of the coating in the event of a plant malfunction leading to an excessive baking temperature and/or time period in the curing oven.

Standard coating physical property tests were performed, and the test results are provided in Table I below.

TABLE 1

| Formulation No. | 1 | 2 | 3 | 4 | 5 | 6 | 7 | 8 |
|---|---|---|---|---|---|---|---|---|
| Acrylic Polyol #1 (pbw) | 100 | 100 | | | 100 | 100 | | |
| Acrylic Polyol #2 (pbw) | | | 100 | 100 | | | 100 | 100 |
| FC430 (10% solution) (pbw) | 0.68 | 0.69 | 0.68 | 0.68 | 0.68 | 0.68 | 0.68 | 0.68 |
| Dibutyl Tin Dilaurate (10% solution) (pbw) | 4 | 4 | 4 | 4 | 4 | 4 | 4 | 4 |
| Sovent Blend (pbw) | 70 | 80 | 70 | 75 | 70 | 70 | 70 | 70 |
| HDI Trimer w/DMP (pbw) | 56.43 | 45.14 | 68.59 | 54.87 | | | | |
| IPDI Trimer w/DMP (pbw) | | 13.34 | | 16.21 | | | | |
| HDI Trimer w/MEKO (pbw) | | | | | 54.00 | 43.20 | 65.64 | 52.51 |
| IPDI Trimer w/MEKO (pbw) | | | | | | 12.89 | | 15.67 |
| VOC (lbs/gal) | 3.33 | 3.53 | 3.30 | 3.39 | 3.77 | 3.77 | 3.81 | 3.81 |
| gms/liter) | 400 | 424 | 396 | 407 | 452 | 452 | 457 | 457 |
| Zahn #2, seconds | 20.2 | 18.8 | 20.7 | 20.8 | 20.9 | 20.9 | 21.8 | 21.4 |
| Dry film Thickness, mils | 4.0 | 3.5 | 3.9 | 4.1 | 4.0 | 4.1 | 4.2 | 4.1 |
| 20° Gloss | 89 | 89 | 90 | 89 | 88 | 85 | 94 | 93 |

TABLE 1-continued

| Formulation No. | 1 | 2 | 3 | 4 | 5 | 6 | 7 | 8 |
|---|---|---|---|---|---|---|---|---|
| 60° Gloss | 94 | 94 | 95 | 94 | 94 | 92 | 94 | 93 |
| Yellowness Index (YIE-313) | | | | | | | | |
| Before Heat Age | 0.39 | 1.22 | −0.57 | −0.62 | 7..12 | 8.39 | 5.51 | 5.18 |
| After Heat Age | 2.10 | 3.41 | 0.2 5 | 1.74 | 16.37 | 17.23 | 11.91 | 10.64 |
| Impact, in-lbs | | | | | | | | |
| Forward | 40 | 35 | 40 | 40 | 40 | 35 | 70 | 60 |
| Reverse | <5 | <5 | <5 | <5 | <5 | 5 | 15 | <5 |
| Pencil Hardness | 4 | 4 | 4 | 4 | 4 | 4 | 4 | 4 |
| Conical Mandrel | Pass | Fail | Pass | Fail | Pass | Fail | Pass | Pass |
| Adhesion | Pass | Pass | Pass | Pass | Pass | Pass | Pass | Pass |
| MEK Double Rubs (100) | Pass | Pass | Pass | Pass | Pass | Pass | Pass | Pass |
| Acid Etch Resistance** | 8 | 9 | 10 | 11 | 11 | 12 | 11 | 12 |
| (Hours to failure | | | | | | | | |
| 12 = best, 1 = worse) | | | | | | | | | acid etch test is a drop test using a blend of acids (65 parts 1.0 N $H_2SO_4$, 30 parts 1.0 $HNO_3$ and 5 parts 1.0 N HCl). One drop of acid is placed on the panel every hour for a total of twelve drops. The acid is washed off using water and dried overnight. The panels are visually inspected for spot damage. The longer time to spotting the better etch resistance.

The yellowness index test was conducted on each test panel before and after heat aging using the ASTM E-313 yellowness Index test in a Hunter laboratory COLORQUEST spectrophotometer. The yellowness index results demonstrate significant improvement in the color of the DMP-blocked formulations (Formulations 1–4) as compared to the MEKO-blocked formulations (Formulations 5–8) for coatings made from the HDI trimer-based and the HDI trimer/IPDI trimer based blend formulations.

(B) UV Light Aging

In another comparison, using QUV (B) light aging of the coatings made with the above HDI trimer in combination with acrylic polymer #1 (from Table I above), and without using any UV stabilizers, the DMP-blocked coating formulation provided a yellowness index after 888 hours of 14.2 as compared to an index of 44 provided using the MEKO-blocked coating formulation using the ASTM E-313 yellowness index test procedure. Thus, the DMP-blocked formulation provided a much improved, whiter coating then did the MEKO-blocked formulation after unblocking.

As used herein, the term "pbw" designates "parts by weight". Unless stated otherwise, all amounts given herein are provided on a weight basis.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. In an improved one component coating composition for providing a clear coating on a substrate, the improvement comprising said composition being free of any hydrazide component and free of a pigment, and said composition consisting essentially of an isocyanate-reactive polymer, a polar aliphatic or polar aromatic solvent, a catalyst, and a blocked polyisocyanate having a pyrazole compound as a blocking agent, said polyisocyanate being selected from the group consisting of isocyanurates of 1,6-hexamethylene diisocyanate, 1,6-hexamethylene diisocyanate biuret, isocyanurates of isophorone diisocyanate, isophorone diisocyanate biuret, and combinations thereof, said blocked polyisocyanate being present in said coating composition in an amount of from about 15 to about 40 weight percent, said solvent being present in said coating composition in an amount of from about 30 to about 50 weight percent, said catalyst being present in said coating composition in an amount of from 0.01 weight percent to about 10 weight percent.

2. The coating composition of claim 1 wherein said catalyst is dibutyltindilaurate.

3. The coating composition of claim 1 wherein said solvent comprises a solvent blend of butyl acetate, methyl amyl ketone, and ethyoxyethyl propionate.

4. The coating composition of claim 3 wherein said blend comprises a 1:1:1 weight ratio of said butyl acetate to said methyl amyl ketone to said ethyoxyethyl propionate.

* * * * *